United States Patent [19]

Pudsey

[11] Patent Number: 4,519,069
[45] Date of Patent: May 21, 1985

[54] COMMUNICATION SYSTEM INTERCONNECTING RADIOS AND OPERATORS LOCATED AT DIFFERENT POSITIONS

[75] Inventor: David G. Pudsey, Rayleigh, England

[73] Assignee: GEC Avionics Limited, Rochester, England

[21] Appl. No.: 437,165

[22] Filed: Oct. 27, 1982

[30] Foreign Application Priority Data

Oct. 28, 1981 [GB] United Kingdom ............... 8132436

[51] Int. Cl.³ .......................................... H04Q 11/04
[52] U.S. Cl. ........................................ 370/85; 370/89
[58] Field of Search ............... 370/85, 96, 90, 93, 370/95, 89, 110.1; 455/2, 69, 70; 340/825.54

[56] References Cited

U.S. PATENT DOCUMENTS

| | | | |
|---|---|---|---|
| 3,603,932 | 9/1971 | Kerr et al. | 340/825.54 |
| 3,985,962 | 10/1976 | Jones et al. | 370/90 |
| 3,987,397 | 10/1976 | Belcher et al. | 455/2 |
| 4,242,749 | 12/1980 | Takezoe | 370/85 |
| 4,290,134 | 9/1981 | Hampshire | 370/85 |
| 4,313,196 | 1/1982 | Oblonsky | 370/95 |
| 4,356,484 | 10/1982 | Eckhardt | 370/95 |
| 4,369,443 | 1/1983 | Giallanza et al. | 455/70 |
| 4,373,183 | 2/1983 | Means et al. | 370/85 |
| 4,445,193 | 4/1984 | Mueller et al. | 370/85 |

FOREIGN PATENT DOCUMENTS 11557 1/1982 Japan ................................. 370/96

Primary Examiner—Douglas W. Olms
Assistant Examiner—Wellington Chin
Attorney, Agent, or Firm—Spencer & Frank

[57] ABSTRACT

A communication system using a control bus and an audio bus to interconnect operator positions and radio positions. Each position is allocated, by a timing circuit, time slots on the control bus during which it applies digital words to the control bus indicating its own identity and information to be transmitted to other positions. Because data applied to the control bus by the operator positions is time multiplexed, requests from operator positions for a particular radio facility are dealt with in turn by the radio positions so that operators at the operator positions cannot compete for the same radio facility. The need for a general purpose computer and its associated software is avoided. Each radio at the radio positions is able to communicate to the operators at the operator positions its current mode of operation so that the operators can always be sure that the system is operating correctly. The system can employ a single timing circuit or a plurality of individual timing circuits each located at a respective position.

7 Claims, 3 Drawing Figures

COMMUNICATION SYSTEM INTERCONNECTING RADIOS AND OPERATORS LOCATED AT DIFFERENT POSITIONS

BACKGROUND OF THE INVENTION

This invention relates to a communication system for interconnecting radios and operators located at different positions. It is believed to be particularly applicable to such systems when located on a vehicle such as an aircraft or a ship where sophisticated radio facilities are required.

One conventional system of the aforementioned type, for use on an aircraft, has used a general purpose computer programmed so that an operator can enter, into the computer, a request for a particular radio facility; whereupon the computer establishes which one of several radios is available to provide that facility and links the operator to that radio. In practice it has been found that the programming of a general purpose computer to do this job is very complex. Furthermore it may be difficult for an operator to be sure that the computer is working correctly at any one time and a fault in the computer or in its programme can result in a complete breakdown of the system. By employing the present invention it is believed that the aforementioned disadvantages can be overcome or at least reduced in severity.

SUMMARY OF THE INVENTION

The invention provides a communication system for interconnecting radios, which are each able to provide at least one radio facility, and operators located at different positions, the system comprising a control bus and an audio bus for interconnecting the operator positions and radios, means at each operator position for applying, in turn, to the control bus a request code constituting a request for a particular radio facility, means associated with each radio for responding to receipt of a request code by applying to the control bus an availability code indicating the radios availability for providing the said facility, means at each operator position for applying to the control bus an instruction code instructing a particular radio to provide a facility requested and for connecting the operator position to a particular channel of the audio bus, and means at the particular radio for providing the requested facility on the said particular channel of the audio bus.

Because, in accordance with the invention, the request codes from different operator positions are applied *in turn* to the control bus, it is ensured that the requests are dealt with in turn and that different operator positions cannot compete for use of the same radio on, for example, different frequencies. This application of the codes in turn to the control bus is a form of time multiplexing. The time multiplexing arrangement preferably allocates respective time periods not only to each operator position but also to each radio for the application of codes from the radios onto the control bus. Thus the control bus is allocated in turn to each operator position and then in turn to each radio and the sequence is repeated indefinitely. The time multiplexing may be effected by means of a central timer but in a preferred system each operator position at each radio has its own timer. This improves the reliability of the system. Each radio preferably has, associated with it, means for providing, on the control bus, a code indicating the radios identity and the facility it is currently providing on the audio bus and the operator position to which that facility is being supplied. A monitoring device or test set may be provided to display or otherwise monitor this information from each of the radios.

BRIEF DESCRIPTION OF THE DRAWINGS

One way in which the invention may be performed will now be described by way of example with reference to the accompanying drawings in which.

DETAILED DESCRIPTION OF THE PREFERRED EMBODIMENT

Figure 1:
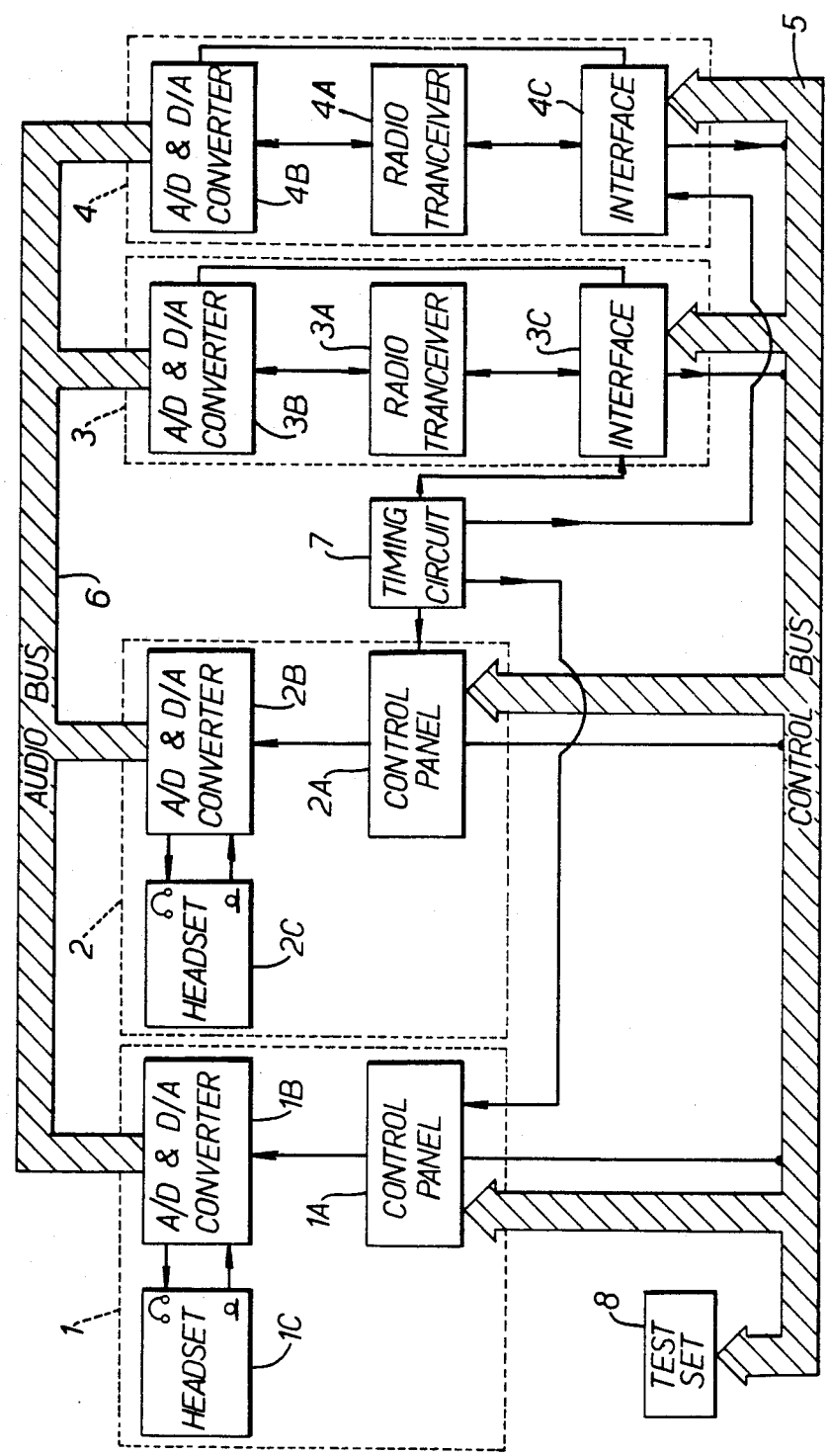
FIG. 1 is a schematic drawing of a communication system constructed in accordance with the invention.

Referring to the drawing there is shown two operator positions 1 and 2 and two radio positions 3 and 4, all being joined by a control bus 5 and an audio bus 6. The bus 5 and bus 6 carry time multiplexed signals and are indicated in thick lines so as to distinguish them from those connections which carry only single signals. The positions 1,2,3 and 4 are all located on the same vehicle which, in this particular embodiment of the invention, is an aircraft.

At each position 3 and 4 is a radio transceiver 3A, 4A each having an associated analogue-to-digital and digital-to-analogue converter 3B and 4B enabling its output and input to be applied to or received from allocated time slots on the audio bus 6. Combined A/D and D/A convertors such as shown at 3B and 4B are well known to those versed in the art and are used commonly for example in modern telephone systems e.g. British Telecom systems. Each transceiver 3A,4A also has an associated interface 3C,4C which produces a digital output code indicating the radio transceiver's identity, the frequency to which it is tuned, whether it can satisfy a request for a particular facility, and the address of the radio position 1 or 2 to which the radio is currently providing a service. This output code is applied to the appropriate time slot on the bus 5 under the control of a timing circuit 7.

Each operator position 1 and 2 includes a control panel 1A,2A. Each control panel has a display for displaying to the operator information received from the control bus 5. It also has controls which can be manipulated by the operator to produce a series of binary digits indicating the identity of the appropriate control panel, and a request for a particular frequency. In more complex embodiments of the invention the operator can also request facilities other than a particular frequency e.g. a particular bandwidth, a particular modulation mode such as amplitude modulation and/or a particular type of antenna required. These codes are applied to the bus 5 in a particular time slot as determined by the timing circuit 7. Thus the timing circuit 7 provides a time multiplexing arrangement which allocates particular time slots on the control bus 5 to associated control panels and radio transceivers. The control panels 1A and 2A also apply switching signals to the analogue-to-digital and digital-to-analogue converters 1B and 2B serving to connect headsets 1C and 2C to appropriate time slots on the audio bus 6.

In operation, an operator at, for example, position 1 manipulates a control on the panel 1A which causes the latter to apply to the control bus 5 a code which consists of a word defining the identity of the control panel 1A and a request word indicating the required frequency. This code is applied to the bus 5 in a time slot defined by the timing circuit 7.

The radio transceivers 3A and 4A receive, simultaneously the aforementioned code produced by the control panel 1A and the transceiver 3A or 4A which is allocated the next time slot on the bus 5 applies to the bus 5, via interface 3C or 4C, a word indicating that the request can be satisfied (assuming of course that that transceiver is capable of satisfying the request). This word indicating that the request can be satisfied is received by the control panel 1A which then produces an instruction word instructing the radio which has indicated its capability of satisfying the request to operate at the required frequency. The appropriate radio, in response to this produces another word indicating its identity and frequency. This is received by the control panel which displays the information received and operates appropriate gates in an analogue-to-digital/digital-to-analogue converter 1B,2B to switch the appropriate radio output to a headset 1C or 2C.

When the radio is no longer required by the operator he manipulates a control on the panel 1A or 2A which then stops applying to the control bus 5 the address of the radio currently connected to the appropriate headset. The control panel, however, continues applying the control bus 5 a code indicating its own identity. All the control panels and all the radios always apply, in their appropriate time slot, to the control bus 5, a code indicating their own identities. This allows, in an alternative embodiment of the invention, the timing circuit 7 to be dispensed with and replaced by individual timing circuits associated with each of the control panels and each of the transceivers. Thus the control panel 1A can be designed to apply its code to the control bus 5 during that time period beginning at a given time after the identity word from transducer 4A has been received; the control panel 2A can be arranged to apply its code to the bus 5 during a time period beginning at a given time after the identity word of control panel 1A has been received; the radio transceiver 3A can be adapted to apply its code to the bus 5 during a time period beginning at a given time after the identity word of control panel 2A has been applied to the bus 5; and the radio transceiver 4A can be adapted to apply its code to the bus 5 during a period beginning at a given time after the identity word of radio transceiver 3 has been applied to the bus 5. By using a timing system distributed between the control panels and radio transceivers in this way, the need for a central timing circuit is eliminated thereby improving the reliability of the system. Further improvement in the reliability can be achieved by arranging for the output words from any one of the elements 1A,2A,3A or 4A to be produced either following a first given delay after the identity of the previous element has been transmitted or at a second time period or following a second, longer, given delay after the identity of the penultimate element has been transmitted. Thus, for example, radio transceiver 3A would be arranged to output its identity word and other words onto the bus 5 either a given time period after control panel 2A had transmitted its identity onto bus 5 or a longer time period after control period 1A had outputted its identity word onto the bus 5.

If more than one control panel requests the same frequency and mode already in use by another control panel, then a single radio transceiver can output, via its associated interface 3C or 4C, onto the bus 5 the address of both panels. In this way, a single radio transceiver is able to provide a similar service to two or more operators. It will, of course, be understood that, in a practical form of the invention, many more than two control panels and two transceivers will be used.

Each control panel is designed to display the identity of the transceiver and the frequency and mode of operation currently in use by the associated operator. This information is transmitted via the bus from the appropriate transceiver. Thus if a transceiver fails this immediately comes to the attention of the operator. If a control panel fails, the associated radio is immediately released for other operators since the inoperative control panel will stop applying an output to the bus 5.

A test set 8 receives all the information from the control bus 5 and displays this information which comprises: which radio is tuned to which frequency and is operating in which mode; and which control panel is connected to each radio. If each radio or control panel is adapted to produce an output indicating a fault condition the test set can also display this.

If desired each control panel 1A can, as an alternative to requesting access to a radio transceiver, request access to another control panel thereby enabling intercommunication between operators.

It will be appreciated that the purpose built circuit which has been described and illustrated can be constructed without undue complexity and provides a relatively fail safe system in which a fault in any one of the elements comes immediately to the attention of an operator and does not result in a breakdown of the entire system. For this reason it is considered that a system constructed generally along the lines described with reference to the drawing could provide a significant advance over the known type of system employing a central computer to effect the connections between the individual radio transceivers and control panels.

Figure 2:
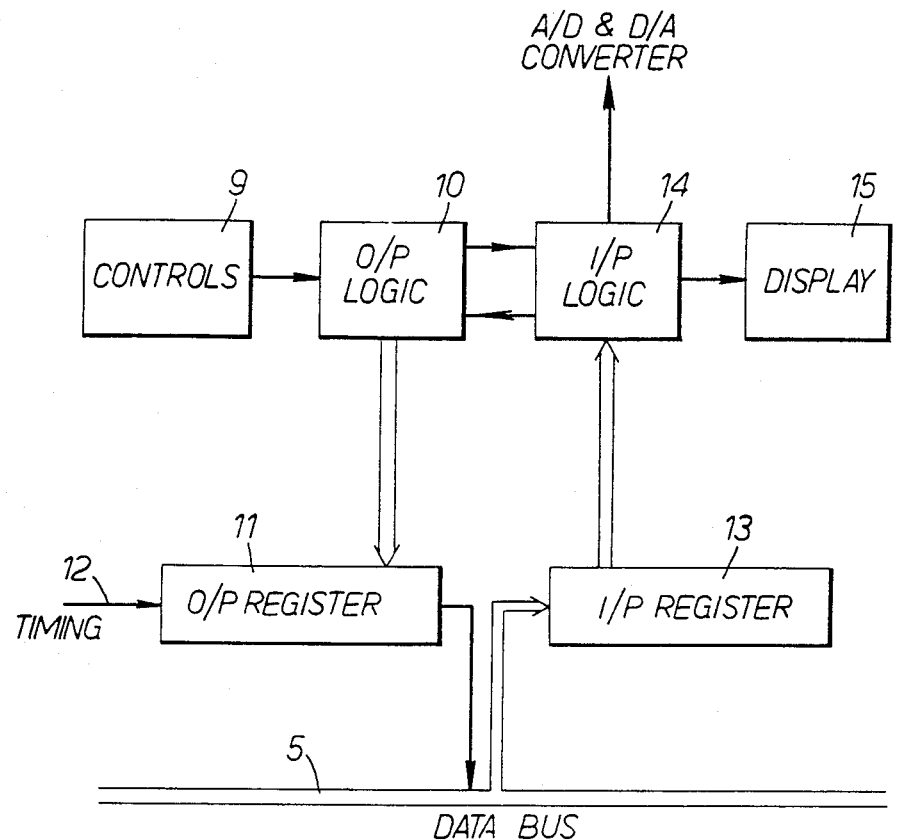
FIG. 2 is a detailed diagram of one of the control panels shown in FIG. 1.

Referring the FIG. 2, this illustrates in greater detail the nature of each of the control panels such as that referenced 1A in FIG. 1.

A frequency control unit 9 provides input to an output logic circuit 10. An operator sets up on control unit 9 the frequency required and operates an "enter" key. In response, the data is set up by O/P logic circuit 10 to form a word which contains the identity of the control panel (a unique identity is given to each control panel of the system) and the frequency required. A further part of the word formed is not yet used. This further part contains a bit allocated as an address for each of the control panels of the system and a bit to indicate that the operator has depressed his transmit key.

The formed word is transferred from output logic circuit 10 to an output register 11 and is outputed to the Data Bus 5 at intervals determined by timing signals on lead 12 from the timing circuit 7 of FIG. 1.

Any radio not in use and capable of satisfying the request will place a word on the Data Bus 5 in its turn. The word will contain the address bit of the requesting control panel. This word is received by an input register 13 and transferred to an input logic circuit 14. The data is decoded by logic circuit 14 and the radio address is transferred to output logic circuit 10. This information is then included in the output word passed to the output register 11 for output to the Data Bus 5 as already described.

The addition of this bit causes the radio interface 3C of FIG. 1 to tune the radio to the requested frequency and then set the 'ready' bit true. The radio interface word containing the 'ready' bit is transferred via input register 13 to input logic circuit 14 which transfers the radio address to the D/A Converter IB in FIG. 1 in order to cause the radio receiver signals on the Audio Bus 6 of FIG. 1 to be decoded and outputed to the operator. The frequency contained in the request radio word is also sent by input logic circuit 14 to a display unit 15 for monitoring by the operator.

Should the radio interface word fail to be continually received through failure of the radio, the radio address bit will be removed from the panel, output word thus returning it to the original request form. This will then be detected by another radio which will replace the failed unit.

A special case occurs should another operator be already using the frequency requested. Before transferring the operator request to the data bus 5, output logic circuit 10 sends the request to the input logic circuit 14 which scans all incoming radio words to check whether any radio in use will satisfy the request. If so then the panel output word will contain the radio address and the radio interfaces replies directly with the panel address, the 'ready' bit being already true.

Figure 3:
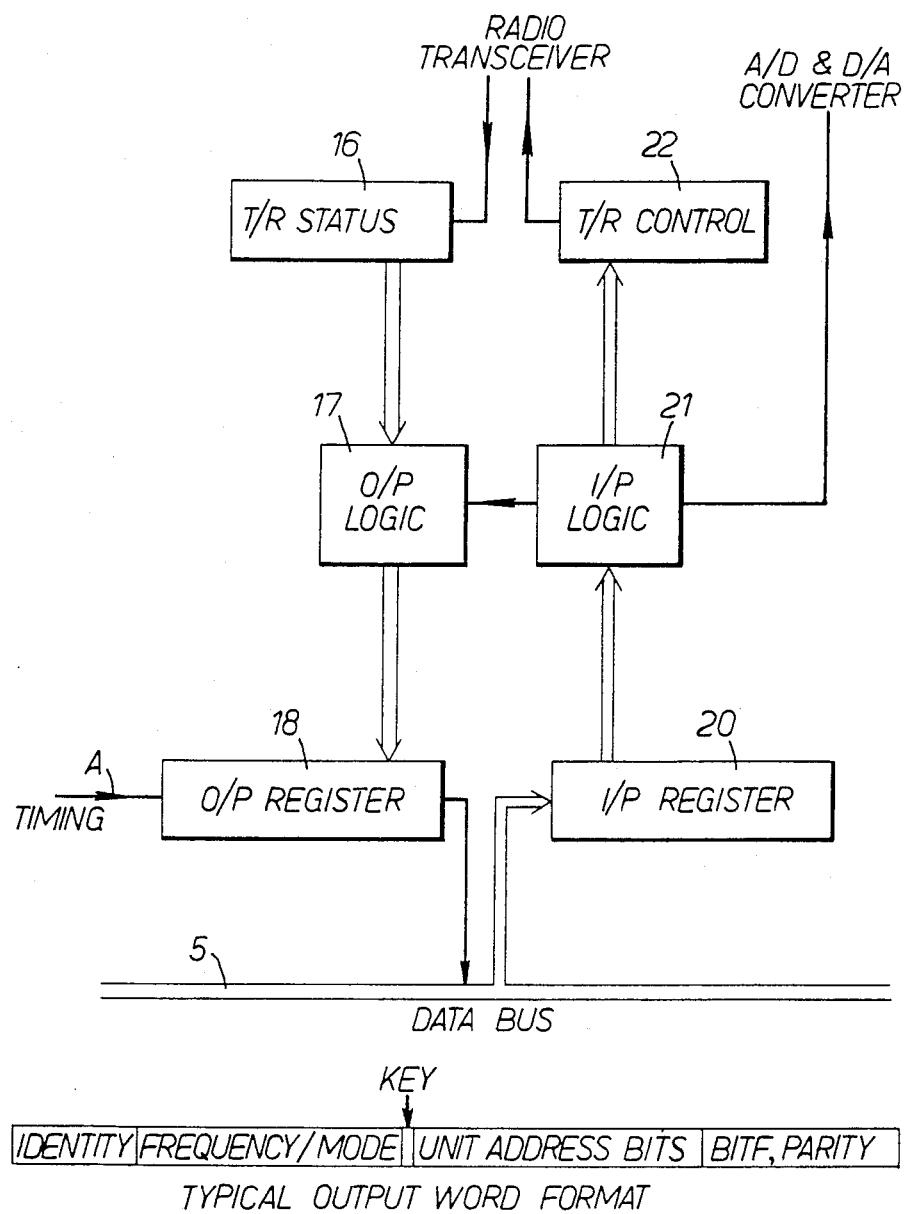
FIG. 3 is a detailed diagram of the interface units shown in FIG. 1. In all Figures like references are used for like parts.

Referring to FIG. 3, this illustrates in greater detail the nature of each of the interface units such as that referenced 3C in FIG. 1.

The radio transceiver 3A of FIG. 1 continually outputs the status word to T/R status circuit 16. Connected to receive this information from circuit 16 is an output logic circuit 17 which forms the output word. This output word contains the identity of the radio, the status of the radio (i.e. frequency, mode etc.), a portion which contains a bit allocated as an address for each of the units of the system and a bit to indicate the 'ready' state. Identity and status are continually present in the word which is outputed to the data bus 5 by an output register 18 at intervals determined by timing pulses on lead 19 derived from timing circuit 7 of FIG. 1.

When a control panel output word which contains no radio address bit is detected by an input register 20 connected to data bus 5, the word is transferred to an input logic circuit 21. If the request can be satisfied by the radio the control panel address is sent to output logic circuit 18 which then includes this information in the output word. On receiving this radio interface word, the control panel includes the radio address to its output word. This word is received by input register 20 and transferred to input logic circuit 21 which outputs the frequency information to a T/R control circuit 22 for onward transmission to the radio. On completion of the tuning cycle, the radio provides a 'ready' signal to T/R status circuit 16 which signal is passed to output logic circuit 17. The new frequency is thus output from output register 18 together with 'ready' bit set true.

Should the panel word fail to be continually received because of a failure in the control panel then the control panel address will be removed from the radio interface output word and if no other control panel addresses are present the 'ready' bit will also be removed and the radio will be available for new assignments.

Should input logic circuit 21 decode the key bit true in a control panel word containing the radio address, then the address is passed to the digital-to-analogue converter 3B in FIG. 1 in order to cause the microphone signals from the operator to be decoded and routed to modulate the transmitter. At the same time a key command is sent via T/R control circuit 22 to the radio.

Below the circuit diagrams in FIGS. 2 and 3 is schematically represented a typical output word format in each case.

I claim:

1. A communication system for interconnecting radios, each able to provide at least one radio facility, and operators located at different positions, the system comprising: a control bus and an audio bus for interconnecting the operator positions and the radios, means at each operator position for applying, in turn to the control bus, a request code constituting a request for a particular radio facility, means associated with each radio for responding to receipt of a request code by applying to the control bus an availability code indicating the radio's availability for providing the said facility, means at each operator position for applying to the control bus an instruction code instructing a particular radio to provide a facility requested and for connecting the operator position to a particular channel of the audio bus, and means at the said particular radio for providing the requested facility on the said particular channel of the audio bus.

2. A communication system according to claim 1 including a time multiplexing arrangement which allocates respective time periods to each operator position and to each radio for the application of codes therefrom onto the control bus.

3. A communication system according to claim 2 wherein the time multiplexing arrangement includes a central timer which allocates the time periods.

4. A communication system according to claim 2 in which the time multiplexing arrangement includes individual timers associated with respective operator positions and radios.

5. A communication system according to claim 1 and including means associated with each radio for providing on the control bus a code indicating the identity of that radio and the facility it is currently providing on the audio bus, and the operator position or positions to which it is directing that facility.

6. A communication system according to claim 1 and including a monitoring device for displaying or monitoring information available on the control bus.

7. A communications system according to claim 1 wherein said radios and operators are located at different positions on the same vehicle.

* * * * *